3,329,629
MODIFIED $Zn_2SiO_4$ COMPOSITIONS
Virgil D. Mochel, Corning, N.Y., assignor to Corning Glass Works, Corning, N.Y., a corporation of New York
No Drawing. Filed Oct. 30, 1964, Ser. No. 407,889
9 Claims. (Cl. 252—518)

ABSTRACT OF THE DISCLOSURE

An electrical semiconducting fused ceramic formed by the addition to zinc orthosilicate of minor amounts of the oxides of indium, gallium or zirconium.

---

This invention relates to electrically semiconducting fused ceramics. In particular it relates to such semiconducting ceramics prepared from modified zinc orthosilicate compositions.

I have now found that the addition of minor amounts of an oxide of indium, gallium or zirconium to zinc orthosilicate results in the formation of a novel ceramic material which is electrically semiconducting. Such materials may be used in the manufacture of resistance elements for electrical applications.

The novel materials of the present invention are fused ceramics consisting essentially of, as analyzed on an oxide basis, $Zn_2SiO_4$ and between about 0.5% and 25% by weight, based on the $Zn_2SiO_4$, of an activator selected from the group consisting of $In_2O_3$, $Ga_2O_3$ and $ZrO_2$.

The phrase "fused ceramic" as used herein is intended to denote a ceramic material which has been crystallized from a molten state. The semiconductive fused ceramics of the present invention are prepared by crystallization of a molten mixture of $Zn_2SiO_4$ and the activator. In one method of preparation, $Zn_2SiO_4$ is intimately mixed with an appropriate amount of the activating oxide and the mixture heated to a temperature above 1509° C. The resultant molten mass is then crystallized by cooling. A convenient source of $Zn_2SiO_4$ which may be employed is the mineral willemite, a naturally occurring form of zinc orthosilicate.

Alternatively, the activated $Zn_2SiO_4$ may be prepared as the reaction product of ZnO and $SiO_2$ with the activator being incorporated in the reaction mixture. Preferably this is achieved by intimately mixing 56 to 80 parts by weight ZnO, 44 to 20 parts $SiO_2$ and an activator oxide in an amount equal to 0.5 to 25 parts by weight per 100 parts of the $Zn_2SiO_4$ formed, heating the mixture to a temperature in excess of 1509° C. to form a molten mass of $Zn_2SiO_4$ and cooling the reaction mixture to a crystalline solid. The ZnO and $SiO_2$ may be employed in the stoichiometric ratio of 73 parts by weight ZnO to 27 parts $SiO_2$ or either of the two constituents may be present in excess within the limits stated above. However, it should be noted that if ZnO is present in excess, the uncombined ZnO in the final composition be activated by the same activators and will constitute a second electrically conductive phase.

In the compositions described herein, the batch constituents have been shown in the oxide form. However, it will be understood that other materials may be substituted which will yield the desired oxides under reaction conditions. For example $ZnCO_3$ may be substituted for ZnO and $In(OH)_3$ may be substituted for $In_2O_3$.

Although I do not wish to be limited to any particular theory as to how the above-described activation takes place, I believe the activation is a result of the incorporation of the activating cation into the lattice structure of the zinc orthosilicate, with the indium, gallium or zirconium ions entering substantially for the zinc. Support for such a theory is found in the fact that X-ray analyses have failed to disclose the presence of the activating oxide as a separate phase.

The following specific examples will serve to further illustrate the present invention in a manner in which it may be practiced:

Example I $Zn_2SiO_4$ was prepared by mixing ZnO and $SiO_2$ in a ratio of about 73:27 at a temperature in excess of 1509° C. and pouring the molten mixture onto a steel slab at room temperature to rapidly crystallize the melt. The resultant crystalline material was probed with an ohmmeter and found to have an infinite resistance. X-ray analysis of the material indicated it to be $Zn_2SiO_4$. A portion of the material was then ground and 10% by weight $In_2O_3$ was added and mixed. The mixture was melted in a silica crucible at about 1510° C. and cooled by pouring the melt onto an iron slab at room temperature. The resistivity of the resultant product was checked at various temperatures and the following data obtained:

| Temp. (° C.): | Specific resistivity (ohm-cm.) |
|---|---|
| 25 | 407 |
| 50 | 384 |
| 75 | 359 |
| 100 | 335 |
| 125 | 312 |

Temp. Coeff., percent/° C., −0.23.

Example II

A batch mixture consisting of 27 parts $SiO_2$, 70 parts ZnO and 10 parts $In_2O_3$ was melted in a silica crucible at about 1525° C. The melt was cooled and crystallized by pouring the molten material onto an iron slab at room temperature. X-ray analysis of the resultant crystalline material indicated it to be predominantly $Zn_2SiO_4$. Electrical measurements of the activated $Zn_2SiO_4$ yielded the following data:

| Temp. (° C.): | Specific resistivity (ohm-cm.) |
|---|---|
| 25 | 630 |
| 50 | 528 |
| 75 | 520 |
| 100 | 504 |
| 125 | 480 |

Temp. Coeff., percent/° C., 0.12.

Other samples were prepared in a similar manner using varying amounts of $In_2O_3$ as well as $ZrO_2$ and $Ga_2O_3$ for the activating oxide. The results indicated that the amount of activating oxide may vary at least between about 0.5% by weight and 25% by weight based on the $Zn_2SiO_4$. Furthermore, it was found that while $ZrO_2$ and $Ga_2O_3$ could be used to activate willemite, their activation ability was considerably less than that of the $In_2O_3$. As a result, I prefer to use $In_2O_3$ as the activating oxide in the composition of the present invention.

Obviously many modifications and variations of the invention as hereinabove set forth may be made without departing from the spirit and scope thereof and only such limitations should be applied as indicated in the appended claims.

I claim:

1. An electrically semiconducting fused ceramic consisting essentially of, as analyzed on an oxide basis, $Zn_2SiO_4$ and an activator selected from the group consisting of $In_2O_3$ and $Ga_2O_3$, said activator being present in an amount of between 0.5 and 25 parts by weight per 100 parts of $Zn_2SiO_4$.

2. A fused ceramic according to claim 1 wherein said activator is $In_2O_3$.

3. A fused ceramic according to claim 2 wherein said $In_2O_3$ is present in the amount of about 10 parts by weight per 100 parts of said $Zn_2SiO_4$.

4. A method of preparing a semiconducting material composed primarily of $Zn_2SiO_4$ which comprises (A) forming a mixture of 56 to 80 parts by weight of ZnO, 44 to 20 parts of $SiO_2$ and an activating oxide in an amount equal to between 0.5 and 25 parts per 100 parts of the $Zn_2SiO_4$ subsequently formed, said activating oxide being a member selected from the group consisting of $In_2O_3$, $Ga_2O_3$ and $ZrO_2$, (B) heating the mixture to a temperature in excess of about 1509° C. to form a molten mass, and (C) cooling to crystallize the melt.

5. A method according to claim 4 wherein said activating oxides is $In_2O_3$.

6. A method according to claim 5 wherein said $In_2O_3$ is present in the mixture in the amount of about 10 parts per 100 parts by weight of said $Zn_2SiO_4$.

7. A method of preparing a semiconducting material which comprises cooling and crystallizing a molten mass of $Zn_2SiO_4$ containing 0.5 to 25 parts of an activating oxide per 100 parts by weight $Zn_2SiO_4$, said activating oxide being a member selected from the group consisting of $In_2O_3$, $Ga_2O_3$ and $ZrO_2$.

8. A method according to claim 7 wherein said activating oxide is $In_2O_3$.

9. A method according to claim 8 wherein said $In_2O_3$ is present in said molten mass in the amount of about 10 parts per 100 parts by weight of said $Zn_2SiO_4$.

References Cited

F. A. Kroger; Luminescence of Solids (1948), Elsevier Pub. Co., pp. 287–88.

LEON D. ROSDOL, *Primary Examiner.*

J. D. WELSH, *Assistant Examiner.*